United States Patent
Eidet (10) Patent No.: US 11,499,887 B2
(45) Date of Patent: Nov. 15, 2022

(54) METHOD, COMPUTER PROGRAM PRODUCT, DEVICE AND SYSTEM FOR DETERMINING IF AN OPTICAL COMPONENT OF AN ELECTRO-OPTICAL SENSOR SYSTEM NEEDS REPLACING

(71) Applicant: SAAB AB, Linkoeping (SE)

(72) Inventor: Per Anders Eidet, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 17/595,014

(22) PCT Filed: May 6, 2019

(86) PCT No.: PCT/SE2019/050398
§ 371 (c)(1),
(2) Date: Nov. 5, 2021

(87) PCT Pub. No.: WO2020/226540
PCT Pub. Date: Nov. 12, 2020

(65) Prior Publication Data
US 2022/0155175 A1   May 19, 2022

(51) Int. Cl.
*G01M 11/02* (2006.01)
*G01S 7/497* (2006.01)
*G01N 21/95* (2006.01)

(52) U.S. Cl.
CPC ............. *G01M 11/02* (2013.01); *G01S 7/497* (2013.01); *G01N 2021/9511* (2013.01)

(58) Field of Classification Search
CPC . G01M 11/02; G01S 7/497; G01N 2021/9511
See application file for complete search history.

(56) References Cited

U.S. PATENT DOCUMENTS 5,278,499 A * 1/1994 Ito ..................... G01R 33/032
356/477
5,841,574 A * 11/1998 Willey ............... G02B 17/0896
356/366

(Continued)

FOREIGN PATENT DOCUMENTS

| DE | 202012003277 U1 | 7/2012 |
| EP | 1672604 A1 | 6/2006 |
| KR | 10-1467927 B1 | 12/2014 |

OTHER PUBLICATIONS

International Searching Authority, International Search Report and Written Opinion received for International Application No. PCT/SE2019/050398, dated Jan. 24, 2020, 11 pages, Swedish Patent and Registration Office, Sweden.

*Primary Examiner* — Sang H Nguyen
(74) *Attorney, Agent, or Firm* — Alston & Bird LLP (57) ABSTRACT

The present disclosure relates to a method for determining an impact of optical component degradation on the functionality of an electro-optical sensor system, said method (100) comprising a step of obtaining (110) test data relating to the state of the optical component; a step of providing (130) a set of correlation values based on test data and correlation data, said correlation data correlating test data to an optical component degradation state, wherein the optical component degradation state relates to a functionality impact of the electro-optical sensor system; and a step of obtaining (140) an electro-optical sensor system functionality estimate based on the provided set of correlation values.

14 Claims, 4 Drawing Sheets

(56) References Cited

U.S. PATENT DOCUMENTS

| | | | | |
|---|---|---|---|---|
| 5,844,568 | A * | 12/1998 | Luther | G06T 3/4023 345/589 |
| 2010/0145321 | A1 * | 6/2010 | Altshuler | A61B 18/203 606/9 |
| 2010/0231707 | A1 | 9/2010 | Davies et al. | |
| 2010/0264904 | A1 * | 10/2010 | Wu | G01R 31/308 324/97 |
| 2011/0134249 | A1 * | 6/2011 | Wood | G01C 3/08 348/E5.09 |
| 2012/0320257 | A1 * | 12/2012 | Shabtay | G02B 27/0068 348/E5.045 |
| 2015/0049941 | A1 * | 2/2015 | Hall | G08B 13/19695 382/165 |
| 2015/0085287 | A1 | 3/2015 | Wustefeld | |
| 2015/0284838 | A1 * | 10/2015 | Marx | C23C 14/0063 204/192.12 |
| 2016/0069997 | A1 * | 3/2016 | Johnson | H04N 5/2254 356/614 |
| 2017/0082497 | A1 * | 3/2017 | Cannata | G01J 5/0853 |
| 2018/0108187 | A1 | 4/2018 | Kosubek et al. | |
| 2018/0196133 | A1 | 7/2018 | Sun | |

\* cited by examiner

| Degradation (0-6) | Photo Test | Stray Light Test | Erroneous Sensor Test |
|---|---|---|---|
| 0 | No Degradation | 100% Detection Range | 100% Sub-Tests OK |
| 1 | . | 100% | 100% |
| 2 | . . . . . . . . . | 100% | 100% |
| 3 | \ | 75% | 90% |
| 4 | \\\ | 67% | 80% |
| 5 | / | 50% | 50% |
| 6 | // | 25% | 10% |

METHOD, COMPUTER PROGRAM PRODUCT, DEVICE AND SYSTEM FOR DETERMINING IF AN OPTICAL COMPONENT OF AN ELECTRO-OPTICAL SENSOR SYSTEM NEEDS REPLACING

CROSS REFERENCE TO RELATED APPLICATIONS

This application is a National Stage Application, filed under 35 U.S.C. § 371, of International Application No. PCT/SE2019/050398, filed May 6, 2019; the contents of which are hereby incorporated by reference in their entirety.

BACKGROUND

Related Field

The present disclosure relates to electro-optical sensor systems.

Description of Related Art

Electro-optical (EO) sensors typically comprise sensitive optics or detector components and therefore require some form of protective housing. A protective housing is especially important for EMR sensor systems mounted on aircrafts. EO sensor systems viewing a multitude of directions, such as an IR search and track system, may comprise a half-sphere like dome structure. In the case of a sensor dome the optical properties of the dome are tailored depending on the EO sensor inside the dome structure.

In an application where the sensor dome is mounted on a supersonic aircraft, the sensor dome is exposed to significant stress from the environment, especially if particles, such as rain or hail is present in the air. Due to the optical demands of the sensor dome limiting the durability of materials used some damage or degradation to the sensor dome may be unavoidable.

Replacement of optical components in an electro-optical sensor system, such as a sensor dome, may be costly as repairs of optical sensor systems may require clean room facilities and/or transport to a distant location. For sensor domes the most common practice is replacement after a certain number of hours of flight. However, since the damage to a sensor dome is strongly correlated to specific events, such as flying during rain or hail, the total amount of hours flown isn't an ideal indicator of sensor dome damage.

US2010231707A1 discloses a method for investigating the condition of a glazing by comparing image data from a first and a second investigation image. Thus, the disclosed method describes the use of photos in order to estimate damages.

There is a need for a cost efficient method to determine when optical component degradation impacts functionality in order to avoid replacing functional optical components or using optical components reducing functionality.

BRIEF SUMMARY

An object of the invention is to determine if an optical component of an electro-optical sensor system needs replacing.

This has in accordance with different embodiments been achieved by means of a method for determining an impact of optical component degradation on the functionality of an electro-optical sensor system. The method comprises a step of obtaining test data relating to the state of the optical component. The method further comprises a step of providing a set of correlation values based on test data and correlation data, said correlation data correlating test data to an optical component degradation state, wherein the optical component degradation state relates to a functionality impact of the electro-optical sensor system. The step further comprises a step of obtaining an electro-optical sensor system functionality estimate based on the provided set of correlation values.

The estimated loss of functionality of the electro-optical (EO) sensor system is used to describe the impact of a damaged optical component in an sensor system, instead of only using measurable quantities of the optical component. In other words an estimation is not carried out sole based on conditions such as "X units of stray light is OK, while X+1 units is not OK". This is achieved by utilizing the sensors and logic (software) of the EO sensor system to obtain a functionality used to generate at least part of the correlation data.

Thereby, sensor functionality decrease due to damage to or degradation of an optical component in an EO sensor system is determined.

The method allows for optical component tests with limited equipment requirements. For example a photo of an optical component may be taken far away from service sites and an estimate of the EO sensor system functionality based on damages and/or degradation to said optical component is instantly determined.

The method utilizes indirect measurement to determine the sensor functionality. The method may utilize at least one reference EO sensor system, wherein at least one optical component is degraded and measured rigorously. For at least one level of degradation at least one measurable quantity, such as a photo and/or a stray light measurement, of the damaged optical component is measured and the functionality of the reference EO sensor system is determined.

The at least one measurable quantity and the corresponding EO sensor system functionality is used to generate correlation data. Utilizing the generated correlation data may allow for a less rigorous measurement in the field, such as capturing a number of photos of the optical component, to yield an estimated EO sensor system functionality.

The term damage and the term degradation should herein be understood as any state or change in state impacting the optical properties of an optical component, such as surface scratches, deformation, material ageing or production defects.

The step of obtaining test data may comprise obtaining photo test data from a photo test. The photo test may comprise capturing at least one image of at least part of the optical component with a camera device.

The step of obtaining test data may comprise obtaining stray light test data from a stray light test. The stray light test comprises sending electromagnetic radiation (EMR) towards at least part of the optical component and detecting the scattering profile of reflected EMR. The stray light test may be a measurement in the infrared spectrum.

The step of obtaining test data may comprise obtaining erroneous sensor test data from an erroneous sensor test. The erroneous sensor test data may comprise information relating to an erroneous target detection and/or classification by an EO sensor system comprising the optical component. The erroneous sensor test utilizes the EO sensor system's own at least one detector and/or detection analysis system, such as an automatic target recognition system, to evaluate if damage to the optical component results in erroneous detection and/or classification. The erroneous sensor test may comprise measuring the frequency of ghosts and/or incorrect classifications by the EO sensor system. The erroneous sensor test may comprise sending EMR mimicking the signature of a typical target and/or scene toward the EO sensor and recording any inconsistencies between the mimicked target and/or scene and what is detected and/or classified by the sensor system. The erroneous sensor test is not limited to EMR mimicking targets and/or scenes but should be understood as utilizing any EMR able to determine the EO-sensor's functionality. The erroneous sensor test may utilize EMR from at least one test target and/or test scene.

Depending on the wavelength used by the EO sensor system, a specific type of damage to optical components in an electro-optical sensor system may or may not have an impact on the sensor functionality, as measured by the erroneous sensor test. A specific type of damage to an optical component may render a sensor system operating in the visual range unusable while having no or insignificant impact on a sensor system operating at longer wavelengths.

The step of providing a set of correlation values may provide a set of correlation values comprising one value. Unless stated otherwise the set of correlation values should be understood to comprise a determined estimated level of EO sensor functionality and the step of obtaining an electro optical sensor system functionality estimate comprises presenting said determined estimated level.

The step of obtaining test data may comprise obtaining test data from a memory storage and/or a communication interface.

The method may comprise a step of storing the test data in a tests database. The step of storing test data may comprise also storing in the tests database the set of correlation values provided by the step of providing a set of correlation values.

The method may comprise a step of updating the correlation data based on the test data stored in the tests database. The correlation data may be updated every time new test data is stored in the tests database. The test data most suitable for updating the correlation data comprises test data from at least two different tests of an optical component in the same state, or test data from at least one test and a corresponding metric related to the functionality of the EO sensor system. The correlation data correlates test data to an optical component degradation state, wherein the optical component degradation state relates to a functionality impact of the electro-optical sensor system.

The method may comprise a step of obtaining external data, wherein said obtained external data is used to update the correlation data. The obtained external data may comprise externally generated correlation data and/or externally obtained test data. The obtained external data may comprise correlation data generated based on computer simulation of an optical component and/or an EO sensor system. The step of obtaining external data may comprise storing the obtained externally data in the tests database.

The step of obtaining a functionality estimate may comprise presenting the estimated electro-optical sensor system functionality based on the provided set of correlation values and a visualization of the test data. The visualization of the test data may comprise a visualization of at least part of the test data obtained from the step of obtaining test data, such as an image obtained from a photo test. The visualization of the test data may comprise a visualization of a product of at least one algorithm having processed at least part of the test data obtained from the step of obtaining test data, such as an algorithm arranged to supress noise or enhance features.

Presenting the functionality estimate may be performed by means of an image display, a numerical display and/or a set of lights. The set of lights may comprise a green, a yellow and a red light indicating minimal, moderate and critical sensor system functionality loss respectively.

The step of obtaining a functionality estimate may comprise presenting an estimated EO sensor system functionality and a visualization of the test data and at least one previously obtained test data of the optical component. The visualization of the at least one previously obtained test data of the optical component may be a visualization of an image of the optical component captured during a previous determining of the impact of optical component degradation on the functionality of an electro-optical sensor system.

The step of obtaining a functionality estimate may comprise obtaining previously obtained test data of the optical component from the tests database. The visualization of the at least one test data obtained from previous testing of the optical component and the visualization of the currently obtained test data may allow the user to see the degradation of the optical component over time.

The present disclosure further relates to a computer program product. The computer program product comprises a program code stored on a readable data storage medium for determining an impact of optical component degradation on the functionality of an electro-optical sensor system. The data storage medium can be non-volatile. The program code is configured to execute the method according to the present disclosure.

The present disclosure relates further to a system for determining an impact of optical component degradation on the functionality of an electro-optical sensor system, said system comprising a set of test devices comprising at least one test device arranged to obtain test data related to the optical component, and a correlation database comprising correlation data correlating a respective optical component state to a corresponding functionality of the electro-optical sensor system. The correlation database is arranged to provide a set of correlation values based on the test data and the correlation data. The system further comprises a functionality indicator arranged present an electro-optical sensor system functionality estimate based on the provided set of correlation values.

The set of test devices may comprise one test device. The set of test devices may comprise a device for measuring properties relating to damage and/or degradation of the optical component and/or the EO sensor system functionality.

The set of test devices may comprises a photo test device, a stray light test device and/or an erroneous sensor test device. The stray light test device may be arranged to utilize infrared light. The erroneous sensor test device may be an erroneous sensor test setup wherein at least part of the EO sensor system is arranged to evaluate the EO sensor system's functionality. The erroneous sensor test device utilizes the EO sensor system's own at least one detector and/or detection analysis system, such as automatic target recognition, to evaluate if damage to the optical component results in erroneous detection and/or classification as EMR is sent towards the EO sensor. The erroneous sensor test device may be arranged to measure the frequency of ghosts and/or incorrect classifications by the EO sensor system. The erroneous sensor test device may be arranged to send EMR mimicking the signature of a typical target and/or scene toward the EO sensor and recording any inconsistencies between the mimicked target and/or scene and what is detected and/or classified by the sensor system. The erroneous sensor test device is not limited to producing EMR mimicking targets and/or scenes but should be understood as utilizing any EMR able to determine the EO-sensor's functionality. The erroneous sensor test device may utilize EMR from at least one test target and/or test scene. The test data may comprise the data acquired during the at least one test and the test parameters and/or EO sensor parameters and/or optical component parameters of said test.

The correlation database may comprise a processor and a memory storage comprising correlation data and a computer program, wherein the computer program is configured to calculate a set of correlation values based on the obtained test data and at least part of the correlation data.

The functionality indicator may comprise an image display, a numerical display and/or a set of lights. The set of lights may comprise a green, yellow and red light indicating minor, moderate and critical sensor functionality loss respectively. The functionality indicator may comprise means arranged to generate sound for communicating the estimated EO sensor system functionality. The functionality indicator may be arranged to present on a display a visual representation of the test data such as photos of the optical component, allowing the user to view the state of the optical component. The functionality indicator may utilize at least one algorithm arranged to enhance the visual representation of said test data. The functionality indicator may be arranged to present on a display a visual representation of the test data and at least one previously obtained test data of the optical component, allowing the user to compare the degradation over time. The functionality indicator may utilize at least one algorithm arranged to compare the at least two test data and present additional degradation information to be presented on the display. Note that with a sufficient amount of previously obtained test data of the specific optical component and correlation data relating to the same type of optical component a user may perform a photo test on said optical component and obtain an accurate estimation of EO sensor system functionality such as the amount of extraneous radiation and probability of ghost targets. The estimated optical component's impact on EO system functionality is determined by comparing the photo test data with correlation data, in contrast to comparing at least one value comprised in and/or derived from the photo test data with a threshold indicating functionality loss.

The system may comprise a tests database arranged to store test data. The tests database may be arranged to provide stored previously obtained test data for updating the correlation data. The correlation data may be updated every time new test data is stored in the tests database. The tests database may be arranged to store sets of correlation values. The tests database and correlation database may be part of the same database. The tests database may be arranged to provide at least one previously obtained test data of the optical component, if available, to the functionality indicator. The correlation data correlates test data to an optical component degradation state, wherein the optical component degradation state relates to a functionality impact of the electro-optical sensor system.

The system may comprise a communication interface arranged to obtain external data from an external database. External data may comprise externally obtained test data and/or externally generated correlation data. The obtained external test data and/or externally generated correlation data may be used to update the correlation data comprised in the correlation database. The obtained external test data and/or externally generated correlation data may be stored in the tests database.

The present disclosure relates to a device for determining an impact of optical component degradation on the functionality of an electro-optical sensor system, said device comprising a test device arranged to obtain test data related to the optical component, and a correlation database comprising correlation data correlating test data to an optical component degradation state, wherein the optical component degradation state relates to a functionality impact of the electro-optical sensor system. The correlation database is arranged to provide a set of correlation values based on the test data and the correlation data. The device further comprises a functionality indicator arranged to present an electro-optical sensor system functionality estimate based on the provided set of correlation values.

The correlation database may comprise a processor and a memory storage comprising correlation data and a computer program, wherein the computer program is configured to calculate a set of correlation values based on the obtained test data and at least part of the correlation data.

The functionality indicator may comprise a numerical display arranged to present a number representing the estimated optical component damage impacting EO sensor system functionality to the user. The functionality indicator may be arranged to present a visualization of the test data.

The test device may be a photo test device and/or a stray light device arranged to obtain test data related to the optical component. The device may be a handheld camera device.

The device may comprise a communication interface arranged to obtain externally generated correlation data from an external database. The obtained externally generated correlation data may be used to update the correlation data comprised in the correlation database. The external database may be part of a system able to generate and update correlation data such as the presently disclosed system for determining an impact of optical component degradation on the functionality of an electro-optical sensor system.

DETAILED DESCRIPTION OF VARIOUS EMBODIMENTS

Throughout the figures, same reference numerals refer to same parts, concepts, and/or elements. Consequently, what will be said regarding a reference numeral in one figure applies equally well to the same reference numeral in other figures unless not explicitly stated otherwise.

The term damage and the term degradation should herein be understood as any state or change in state impacting the optical properties of an optical component, such as surface scratches, deformation, material ageing or production defects.

Figure 1:
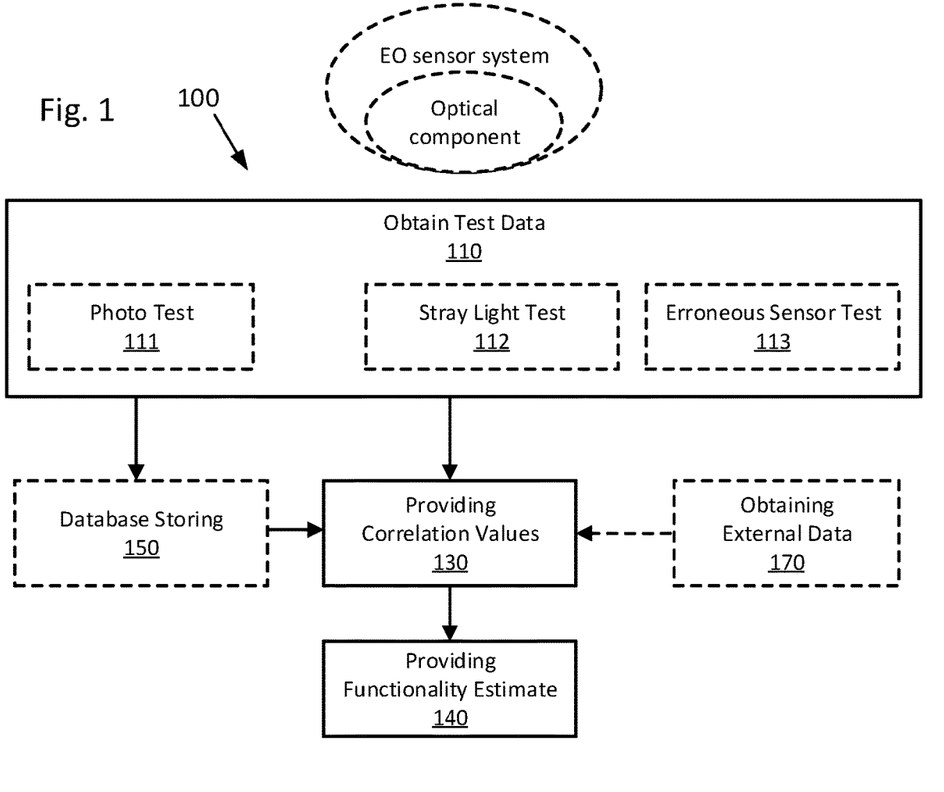
FIG. 1 shows schematically a method for evaluating an optical component.

FIG. 1 shows schematically a method 100 for determining an impact of optical component degradation on the functionality of an electro-optical (EO) sensor system. The method 100 comprises a step of obtaining 110 test data, wherein test data may be obtained by performing at least one test on the optical component and/or the EO sensor system.

The test data may comprise the data acquired during the at least one test and the test parameters and/or EO sensor parameters and/or optical component parameters of said test. The at least one test may be performed by at least one test device.

The optical component may be a sensor lens, a window, an optical filter or an optical fibre. The present disclosure may be most suitable for use on optical components of a type for which the time of use is a poor indicator of degeneration, such as an aircraft sensor lens inconsistently exposed to rain or hail.

The estimated loss of functionality of the electro-optical (EO) sensor system is used to describe the impact of a damaged optical component in an EO sensor system, instead of only using measurable quantities of the optical component. In other words an estimation is not carried out sole based on conditions such as "X units of stray light is OK, while X+1 units is not OK". This is achieved by utilizing the sensors and logic (software) of the EO sensor system to obtain a functionality used to generate at least part of the correlation data.

The step of obtaining 110 test data may comprise obtaining photo test data from a photo test 111. Obtaining photo test data from a photo test 111 may comprise capturing at least one image of at least part of the optical component.

The step of obtaining 110 test data may comprise obtaining stray light test data from a stray light test 112. Obtaining stray light test data from a stray light test 112 comprises sending electromagnetic radiation (EMR) towards at least part of the optical component and detecting the scattering profile of reflected EMR. Obtaining stray light test data from a stray light test 112 may comprise utilizing infrared light.

The step of obtaining 110 test data may comprise obtaining erroneous sensor test data from an erroneous sensor test 113. Obtaining erroneous sensor test data from an erroneous sensor test 113 utilizes the EO sensor system's own at least one detector and/or detection analysis system, such as automatic target recognition, to evaluate if damage to the optical component results in erroneous detection and/or classification as EMR is sent toward the EO sensor. The erroneous sensor test 113 may comprise measuring the frequency of ghosts (false targets) and/or incorrect classifications by the EO sensor system. The erroneous sensor test 113 may comprise sending EMR mimicking the signature of a typical target and/or scene toward the EO sensor and recording any inconsistencies between the mimicked target and/or scene and what is detected and/or classified by the sensor system. The erroneous sensor test 113 is not limited to EMR mimicking targets and/or scenes but should be understood as utilizing any EMR able to determine the EO-sensor's functionality. The erroneous sensor test 113 may utilize EMR from at least one test target and/or test scene. The step of obtaining 110 test data may comprise obtaining test data from a memory storage and/or a communication interface.

The method 100 further comprises a step of providing 130 a set of correlation values, wherein the set of correlation values are generated based on the test data and at least part of correlation data. The correlation data relates to previously determined correlations between previously obtained test data and the functionality of the EO sensor system. The correlation data correlates test data to an optical component degradation state, wherein the optical component degradation state relates to a functionality impact of the electro-optical sensor system. The test data and at least part of the correlation data generates a set of correlation values comprising at least one value relating to an estimated EO sensor system functionality. The correlation data may relate test data to the damage to and/or degradation of the optical component and/or functionality of the EO sensor system, such as the amount of extraneous radiation or the probability/frequency of ghost targets.

The method 100 utilizes indirect measurement to determine the sensor functionality. The method 100 may utilize at least one reference EO sensor system, wherein at least one optical component is degraded and measured rigorously. For at least one level of degradation at least one measurable quantity, such as a photo and/or a stray light measurement, of the damaged optical component is measured and the functionality of the reference EO sensor system is determined. The at least one measurable quantity and the corresponding EO sensor system functionality is used to generate correlation data. Utilizing the generated correlation data may allow for a less rigorous measurement in the field, such as capturing a number of photos of the optical component, to yield an estimated EO sensor system functionality.

The method 100 comprises a step of obtaining 140 a functionality estimate, wherein the functionality estimate is based on the set of correlation values. Obtaining the functionality estimate may be performed by means of an image display, a numerical display and/or a set of lights. The set of lights may comprise a green, a yellow and a red light indicating minimal, moderate and critical sensor system functionality loss respectively. The step of obtaining 140 a functionality estimate may comprise generating sound for communicating the estimated functionality. The step of obtaining 140 a functionality estimate may comprise presenting a level of estimated electro-optical sensor system functionality and a visualization of the test data. The visualization of the test data may be a visualization of the raw data from the step of obtaining data and/or a visualization of the product of at least one algorithm having processed said raw data, such as an algorithm arranged to supress noise or enhance features.

The method 100 may comprise a step 150 of storing test data. The step 150 of storing test data may comprise storing test data in a tests database. The step 150 of storing test data may also comprise storing a set of correlation values in the tests database. The test data most suitable for updating the correlation data comprises test data from at least two different tests of an optical component in the same state, or test data from at least one test and a metric related to the functionality of the EO sensor system.

When a tests database is present the step of obtaining 140 a functionality estimate may comprise obtaining stored previously obtained test data form the tests database. The step of obtaining 140 a functionality estimate may comprise presenting a visualization of previously obtained test data of the optical component obtained from the tests database. The step of obtaining 140 a functionality estimate may comprise presenting a level of estimated electro-optical sensor system functionality and a visualization of the test data and at least one previously obtained test data of the optical component obtained from the tests database.

The method 100 may comprise a step of obtaining 170 external data. The obtained external data may be used to update the correlation data. The obtained external data may comprise externally generated correlation data and/or externally obtained test data for generating correlation data. The externally obtained test data and/or externally generated correlation data from the step of obtaining 170 external data may be stored in the tests database.

Figure 2:
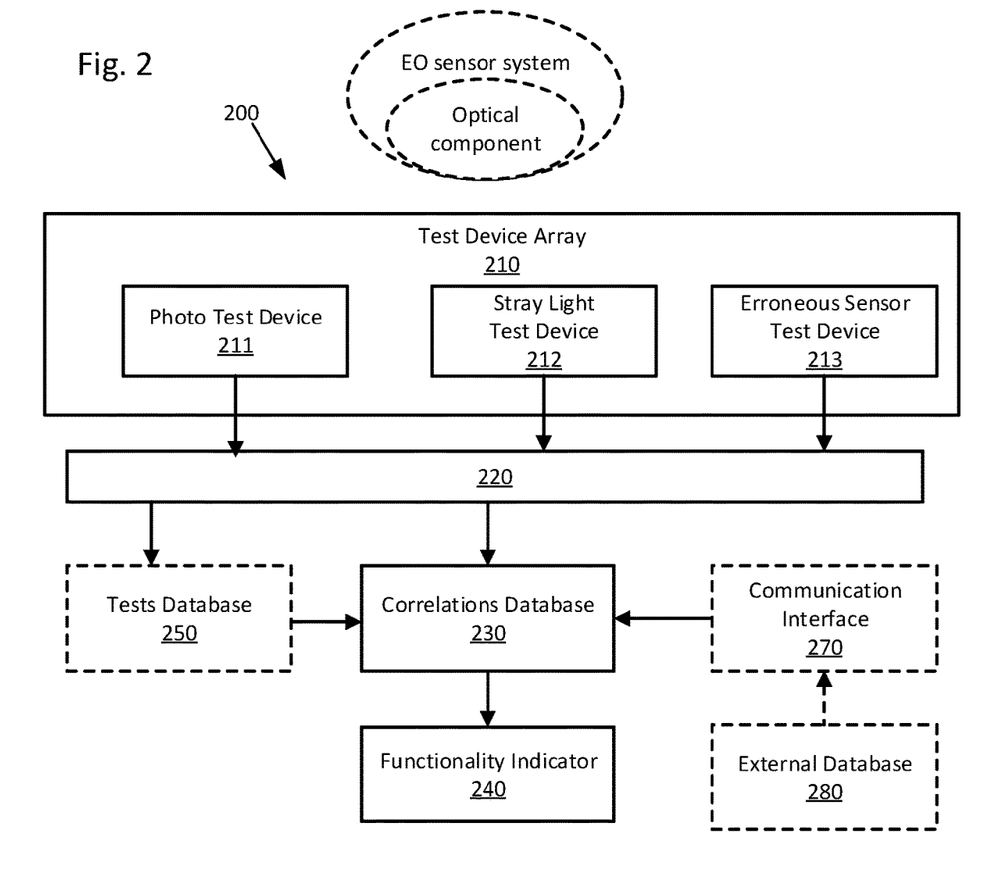
FIG. 2 depicts schematically a system for evaluating an optical component.

FIG. 2 shows schematically a system 200 for determining an impact of optical component degradation on the functionality of an electro-optical sensor system. The system 200 comprises a set of test devices 210 comprising at least one device for obtaining test data related to an optical component and/or an EO sensor system. The at least one device for obtaining test data may be a device for measuring properties relating to optical component damage and/or EO sensor system functionality. In the example system 200 in FIG. 2 the set of test devices 210 comprises a photo test device 211 and/or a stray light test device 212 and/or an erroneous sensor test device 213.

The photo test device 211 may comprise a digital camera device.

The stray light test device 212 is arranged to send electromagnetic radiation (EMR) into at least part of the optical component and measure electromagnetic radiation reflected and scattered in the optical component by means of EMR sensors. The stray light test device 212 may be arranged to utilize infrared light.

The erroneous sensor test device 213 utilizes the EO sensor system's own at least one detector and/or detection analysis system, such as automatic target recognition, to evaluate if damage to the optical component results in erroneous detection and/or classification as EMR is sent toward the EO sensor. The erroneous sensor test device 213 may be arranged to measure the frequency of ghosts and/or incorrect classifications by the EO sensor system. The erroneous sensor test device 213 may be arranged to send EMR mimicking the signature of a typical target and/or scene toward the EO sensor and recording any inconsistencies between the mimicked target and/or scene and what is detected and/or classified by the sensor system. The erroneous sensor test device 213 is not limited to producing EMR mimicking targets and/or scenes but should be understood as utilizing any EMR able to determine the EO-sensor's functionality. The erroneous sensor test device 213 may utilize EMR from at least one test target and/or test scene. The test data may comprise the data acquired during the at least one test and the test parameters and/or EO sensor parameters and/or optical component parameters of said test.

During an erroneous sensor test the internal logics and image interpretation of the EO system, e.g. Automatic Target Recognition functionality, is utilized to tell how the actual degradation of the optical component affects the system functionality, such as generating a false positive or not. The actual performance degradation on the system level can therefore be achieved without the uncertainty of involving the statements, such as stray lights below a first value of units is ok, and above a second value is not ok.

The system 200 comprises a correlation database 230 arranged to provide a set of correlation values. The correlation database 230 comprises correlation data relating to previously determined correlations based on previously obtained test data and the optical component damage and/or the functionality of the EO sensor system. The test data and at least part of the correlation data generates a set of correlation values comprising at least one value relating to an estimated EO sensor system functionality. The correlation database 230 may be arranged to continuously update the correlation data based on new obtained test data.

The system 200 comprises a functionality indicator 240 arranged to present an EO sensor system functionality estimate based on the set of correlation values. The functionality indicator 240 may be an image display, a numerical display and/or a set of lights. The set of lights may comprise a green, yellow and red light indicating minor, moderate and critical sensor functionality loss respectively.

The functionality indicator 240 may be arranged to present on a display a visual representation of the test data such as images of the optical component, allowing the user to view the state of the optical component. The functionality indicator 240 may utilize at least one algorithm arranged to enhance the visual representation of said test data. The functionality indicator 240 may be arranged to present on a display a visual representation of the test data and at least one previously obtained test data of the optical component, allowing the user to compare the degradation over time. The functionality indicator 240 may utilize at least one algorithm arranged to compare the at least two test data and present additional degradation related information on the display. Note that a sufficient amount of test data of the specific optical component and correlation data relating to the type of optical component may allow a user performing a photo test 110 on said optical component to obtain an accurate estimation of the amount of extraneous radiation and probability of ghost targets, normally measured by the stray light test and the erroneous sensor test respectively.

The system 200 may comprise a tests database 250 arranged to store test data. The tests database 250 may be arranged to provide stored previously obtained test data for updating the correlation data. The correlation data may be updated every time new test data is stored in the tests database 250. The tests database 250 may be arranged to store sets of correlation values. The tests database 250 and correlation database 230 may be part of the same database. The tests database 250 may be arranged to provide at least one previously obtained test data of the optical component, if available, to the functionality indicator 240.

The system 200 comprises a communication infrastructure 220 arranged to transmit test data from the set of test devices 210 to a correlation database 230. The communication infrastructure 220 may be arranged to transmit test data from the at least one test device to a tests database 250. The communication infrastructure 220 may be arranged to transmit sets of correlation values from the correlation database 230 to the functionality indicator 240 (not shown).

The system 200 may comprise a communication interface 270 arranged to obtain external data from an external database 280. The external data may comprise externally obtained test data and/or externally generated correlation data. The obtained external test data and/or externally generated correlation data may be used to update the correlation data comprised in the correlation database 230. The obtained external test data and/or externally generated correlation data may be stored in the tests database 250.

The system 200 comprises at least one processor and/or memory storage and/or computer program (not shown) arranged to carry out the computational and/or communication requirements of the system 200. The system may comprise a computer program product stored on a readable data storage medium, wherein the program code is configured to execute the method according to the present disclosure.

Figure 3:
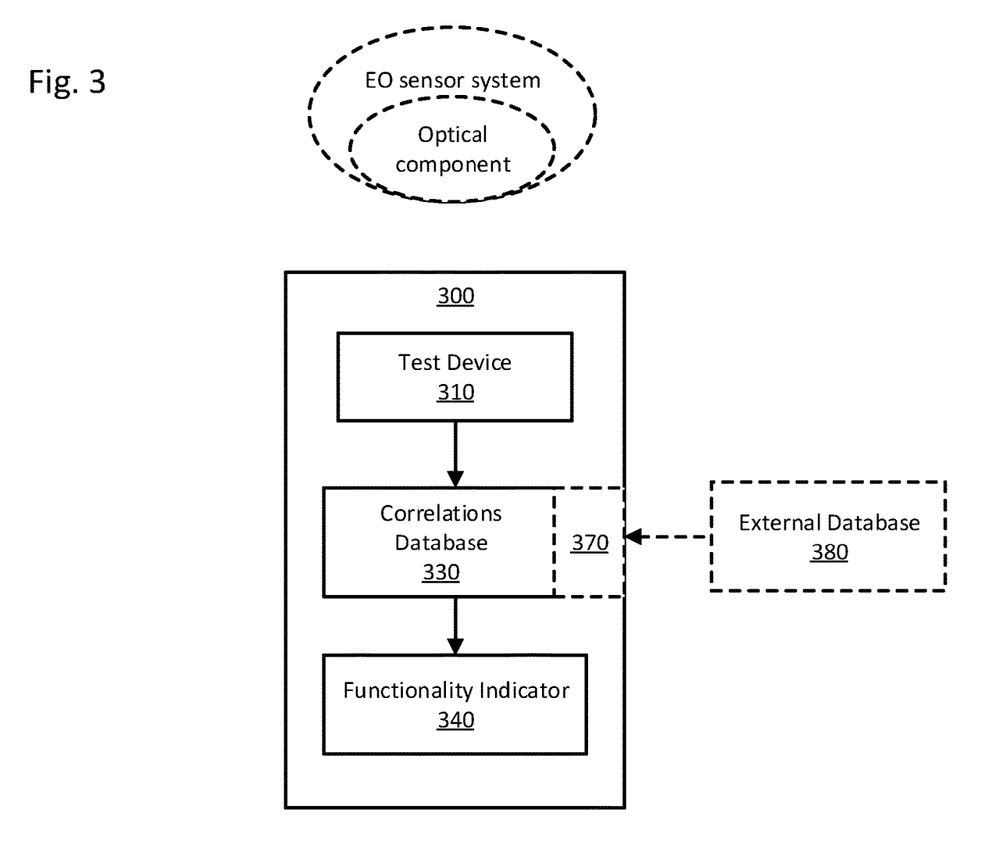
FIG. 3 depicts schematically a device for evaluating an optical component.

FIG. 3 depicts schematically a device 300 for determining an impact of optical component degradation on the functionality of an electro-optical sensor system. The example device 300 comprises a test device 310, a correlation database 330 comprising correlation data and a functionality indicator 340. The test device 310 may be a photo test device or a stray light device. The device 300 may be a handheld device, such as a mobile camera device. The correlation database 330 of the device 300 may be arranged to receive correlation data from an external database 380. The device 300 may comprise a communication interface 370 arranged to obtain externally generated correlation data from an external database 380. The obtained externally generated correlation data may be used to update the correlation data comprised in the correlation database 330. The external database 380 may be part of a system able to generate and update correlation data such as the system 200 in FIG. 2.

During use a user obtains test data of the optical component with the test device 310. The test data may be sent to the correlation database 330. The test data and at least part of the correlation data is used to generate a set of correlation values. At least one algorithm may be used to generate the set of correlation values. The set of correlation values may comprise a single value indicating an estimated sensor system functionality, such as a percentage. The set of correlation values is sent to the functionality indicator 340. The functionality indicator 340 comprises a numerical display arranged to present a number representing the estimated EO sensor system functionality is presented for the user. The functionality indicator 340 may be arranged to present a visualization of the test data.

The device 300 comprises at least one processor and/or memory storage and/or computer program (not shown) arranged to carry out the computational and/or communication requirements of the device 300. The device may comprise the computer program product stored on a readable data storage medium, wherein the program code is configured to execute the method according to the present disclosure.

Figure 4:
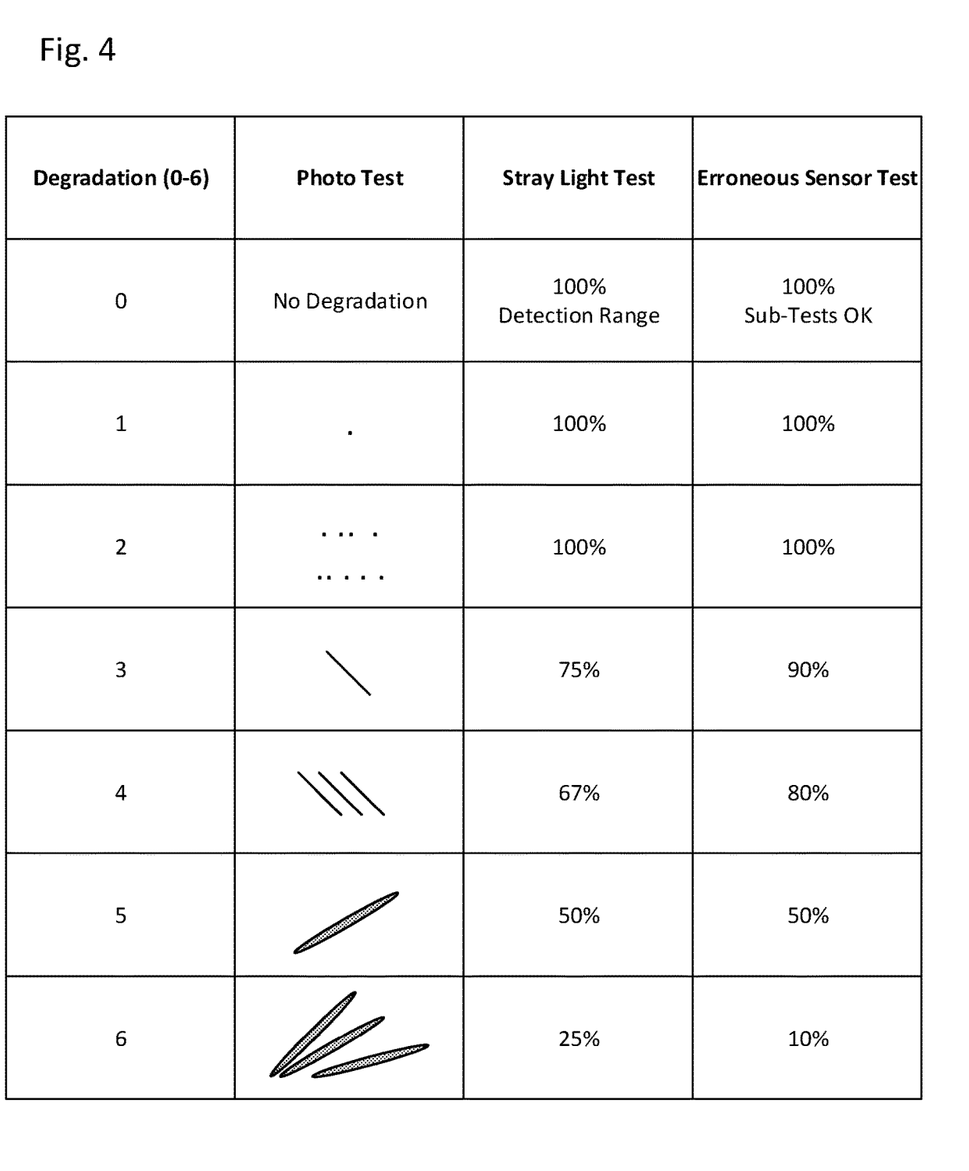
FIG. 4 depicts schematically an illustration of an example of correlation data.

FIG. 4 shows a simplified illustration of correlation data. The example correlation data represents test data from performing three types of tests on a reference EO sensor system comprising a reference optical component using a photo test device, a stray light test device and an erroneous sensor test setup. The reference optical component and/or reference EO sensor system has been measured on with the reference optical component in pristine condition. The reference optical component has been exposed to conditions causing damage to the reference optical component 6 times, with measurements taken with all measurements types after each exposure. An example of correlation data based on the test data obtained from tests of each of the 7 states of the reference optical component is seen in FIG. 4.

The number of exposures is listed in the 1st (leftmost) column in the table in FIG. 4, representing a progressive degradation. The 2nd column lists the reference optical component damage visible in the photo test data (images) for the different levels of degradation. The 2nd column represents photos of a point damage (1), multiple point damages (2), a single scratch (3), multiple scratches (4), a single gash (5) and multiple gashes (6). The 3rd column lists an estimated decrease in detection range of the reference EO sensor system based on analysis of the stray light data. The 4th column lists the number of amount of erroneous sensor events, such as false target recognitions or incorrect classifications due to reference optical component damage. In this example, the reference EO sensor system has undergone a set of sub-tests during each erroneous sensor test, wherein each sub-test comprised a target and/or scene representing a scenario typically encountered during operation. In this example the reference EO sensor system utilizes algorithms arranged to remove noise during the process of detecting and/or classifying. This is seen in the erroneous sensor test as the first levels of degeneration having minimal impact on the reference EO sensor system's ability to detect and/or classify correctly.

The example correlations table in FIG. 4 may be used to estimate the impact on EO sensor system functionality due to an optical component with an unknown level of degradation of the same model as the reference optical component. By performing a photo test on the optical component of unknown degradation and comparing the obtained photo test data with the photo data of the reference optical component an estimated degradation level may be calculated. If the optical component photos best match to reference optical component photos representing degradation level 1-2 the corresponding results from stray light tests and erroneous sensor tests on the reference optical component indicate that optical component is expected to have minimal negative impact on EO sensor system functionality. If the optical component photos best matches to reference optical component photos representing degradation level 4-5 the corresponding results from stray light tests and erroneous sensor tests on the reference optical component indicate that optical component is expected to have significant negative impact on EO sensor system functionality, whereby a more thorough measurement and/or replacement of the optical component is advised.

The table in FIG. 4 clarifies the ability to link test data obtained with different test devices or setups with correlation data. The correlation data is in no way limited to the type of table illustrated in FIG. 4. The correlation data is preferably generated with test data obtained by performing a number of degradation series with a multitude of tests for each level of degradation with a number of optical components. The correlation data is further preferably generated based on test data obtained from multiple tests performed on optical components degraded by normal use in an EO sensor system, such as an aircraft sensor dome degrading while flying.

Turning back to FIG. 3, an example of using the device 300 to determine an optical component damage's impact on electro-optical sensor system functionality will now be described. The use of the present disclosure is in no way limited by the described determining of an optical component damage's impact on electro-optical sensor system functionality. In this example the device 300 comprises a test device 310 comprising a photo test device, a correlation database 330 and a functionality indicator 340 comprising a numerical indicator. The device 300 comprises a communication interface 370 arranged to obtain externally generated correlation data from an external database 380. The device 300 comprises a processor arranged to control the photo test device 310 and functionality indicator 340, and to carry out calculations and comparisons based on test data and correlation data.

Prior to determining an optical component damage's impact on electro-optical sensor system functionality the user connects the device 300 via the communication interface 370 to obtain updated correlation data from an external database 380 for storage in the correlation database 330.

The user aims the photo test device 310 at the optical component towards five predetermined locations capturing three images of each location, the predetermined locations correspond to the locations used for photo tests performed to generate the correlation data for said type of optical component. The five triplets of images and a corresponding part of the correlation data is compared utilizing image processing algorithms to provide a set of correlation values. The set of correlation values comprise an estimated electro-optical sensor system functionality value and a reliability value, wherein the reliability value represents the level of certainty in the provided functionality value. As an example a first set of photos matching degradation level 3, as seen in FIG. 4, and a second set of photos matching degradation level 2-4 may result in the same estimated functionality value but the first set of images would result in a higher reliability value.

The functionality value and reliability value are presented at the numerical display allowing the user to read if the optical component and/or EO sensor system needs service.

The invention claimed is:

1. A method for determining an impact of optical component degradation on the functionality of an electro-optical sensor system, said method (100) comprising
obtaining (110) test data relating to the state of the optical component contained in the electro-optical sensor system,
calculating (130), via execution of a processor of a computer, a set of correlation values based on the obtained test data and correlation data, the correlation data correlating the obtained test data to an optical component degradation state, the optical component degradation state relating to a functionality impact of the electro-optical sensor system, and
calculating, via execution of the processor, (140) an electro-optical sensor system functionality estimate based on the provided set of correlation values,
wherein the obtaining (110) of the test data comprises performing at least one test on the optical component utilizing at least one test device (211, 212, 213) configured to perform at least one of a stray light test, a photo test, or an erroneous sensor test for acquiring the test data.

2. The method according to claim 1, wherein the obtaining (110) of the test data comprises obtaining photo test data from the photo test (111).

3. The method according to claim 1, wherein the obtaining (110) of the test data comprises obtaining stray light test data from the stray light test (112).

4. The method according to claim 3, wherein the stray light test (112) is a measurement in the infrared spectrum.

5. The method according to claim 1, wherein the obtaining (110) of the test data comprises obtaining erroneous sensor test data from the erroneous sensor test (113).

6. The method according to claim 1, wherein the correlation data is generated based on at least one measurable quantity of a reference optical component and the corresponding functionality of a reference EO sensor system.

7. The method according to claim 1, further comprising storing (150) the test data in a tests database (250).

8. The method according to claim 7, further comprising updating the correlation data based on the test data stored in the tests database (250), wherein the correlation data may be updated every time new test data is stored in the tests database (250).

9. The method according to claim 1, further comprising obtaining (170) external data, wherein said obtained external data is used to update the correlation data.

10. The method according to claim 1, wherein the calculating (140) of the functionality estimate comprises presenting a level of estimated electro-optical sensor system functionality and a visualization of the test data.

11. The method according to claim 10, wherein the calculating (140) of the functionality estimate comprises presenting a level of estimated electro-optical sensor system functionality and a visualization of the test data and at least one previously obtained test data of the optical component.

12. A computer program product for performing the method for determining an impact of optical component degradation on the functionality of an electro-optical sensor system according to claim 1.

13. A system for determining an impact of optical component degradation on the functionality of an electro-optical sensor system, said system (200) comprising
a set of test devices (210) comprising at least one test device (211, 212, 213) configured to obtain test data from the optical component contained in the electro-optical sensor system,
a correlation database (230) comprising correlation data correlating the obtained test data to an optical component degradation state, wherein the optical component degradation state relates to a functionality impact of the electro-optical sensor system, wherein the correlation database (230) is configured to calculate, via execution of a computer processor, a set of correlation values based on the obtained test data and the correlation data, and
a functionality indicator (240) configured to generate, via execution of a computer processor, an electro-optical sensor system functionality estimate based on the provided set of correlation values,
wherein the test device (210) is configured to perform at least one test on the optical component to acquire the test data, the at least one test being one of: a stray light test, a photo test, or an erroneous sensor test.

14. A device for determining an impact of optical component degradation on the functionality of an electro-optical sensor system, said device (300) comprising
a test device (211) configured to obtain test data related to the optical component contained in the electro-optical sensor system,
a correlation database (330) comprising correlation data correlating the obtained test data to an optical component degradation state, wherein the optical component degradation state relates to a functionality impact of the electro-optical sensor system, wherein the correlation database (330) is configured to calculate, via execution of a computer processor, a set of correlation values based on the obtained test data and the correlation data, and
a functionality indicator (340) configured to generate, via execution of a computer processor, an electro-optical sensor system functionality estimate based on the provided set of correlation values,
wherein the test device (211) is configured to perform at least one test on the optical component to acquire the test data, the at least one test being one of: a stray light test, a photo test, or an erroneous sensor test.

* * * * *